(12) United States Patent
Veal (10) Patent No.: US 6,641,160 B1
(45) Date of Patent: Nov. 4, 2003

(54) BOAT TRAILER SKID

(76) Inventor: Robert Carl Veal, 3667 Dornbush Ave., Callahan, FL (US) 32011

( * ) Notice: Subject to any disclaimer, the term of this patent is extended or adjusted under 35 U.S.C. 154(b) by 106 days.

(21) Appl. No.: 09/499,124

(22) Filed: Feb. 7, 2000

(51) Int. Cl.$^7$ ................................................ B62D 63/00
(52) U.S. Cl. ..................... 280/414.1; 280/762; 248/157
(58) Field of Search ................ 280/414.1, 414.2, 280/762, 763.1, 764.1, 765.1; 248/157, 214, 188.5, 688, 346.06, 352, 351, 393, 420, 163.2, 133

(56) References Cited

U.S. PATENT DOCUMENTS

| | | | | |
|---|---|---|---|---|
| 3,933,372 A | * | 1/1976 | Herndon | 280/763.1 |
| 4,434,995 A | * | 3/1984 | Toy | 280/414.1 |
| 5,195,767 A | * | 3/1993 | Des Roches | 280/414.1 |
| 5,509,687 A | * | 4/1996 | Thorndike | 280/763.1 X |
| 5,806,871 A | * | 9/1998 | Eggleston | 280/414.1 |

* cited by examiner

*Primary Examiner*—Kenneth R. Rice
*Assistant Examiner*—Christopher Buchanan
(74) *Attorney, Agent, or Firm*—John Wiley Horton (57) ABSTRACT

An adjustable skid to be attached to the frame of a boat trailer just forward of the trailer wheels. Two skids would commonly be used, one for each side of the trailer. The function of the skids is to prevent the wheels of the trailer from rolling over the end of the launching ramp.

7 Claims, 9 Drawing Sheets

BOAT TRAILER SKID

BACKGROUND

1. Field of Invention

This invention relates to the field of boat trailers. More specifically, the invention comprises a skid assembly which may be attached to the frame of a boat trailer just forward of the wheels. The purpose of the skid assembly is to prevent the boat trailer wheel from dropping abruptly off the end of a ramp, thereby causing the trailer to become stuck.

2. Description of Prior Art

Boat trailers are well known in the prior art. They commonly have two dominant principles guiding their design: (1) they must carry the boat securely as it is towed down the highway, and (2) they must facilitate the launching and recovery of the boat, typically using a concrete ramp. It is this second concern which often proves the most daunting challenge.

Boat launching ramps must be fairly steep, typically having a grade between 5% and 9%. This results from the fact that the trailer must be sufficiently submerged to float the boat free while the car or truck is still on dry ground. The steep grade causes difficulty when the boat is recovered and the car or truck attempts to pull it up the ramp.

Figure 1:
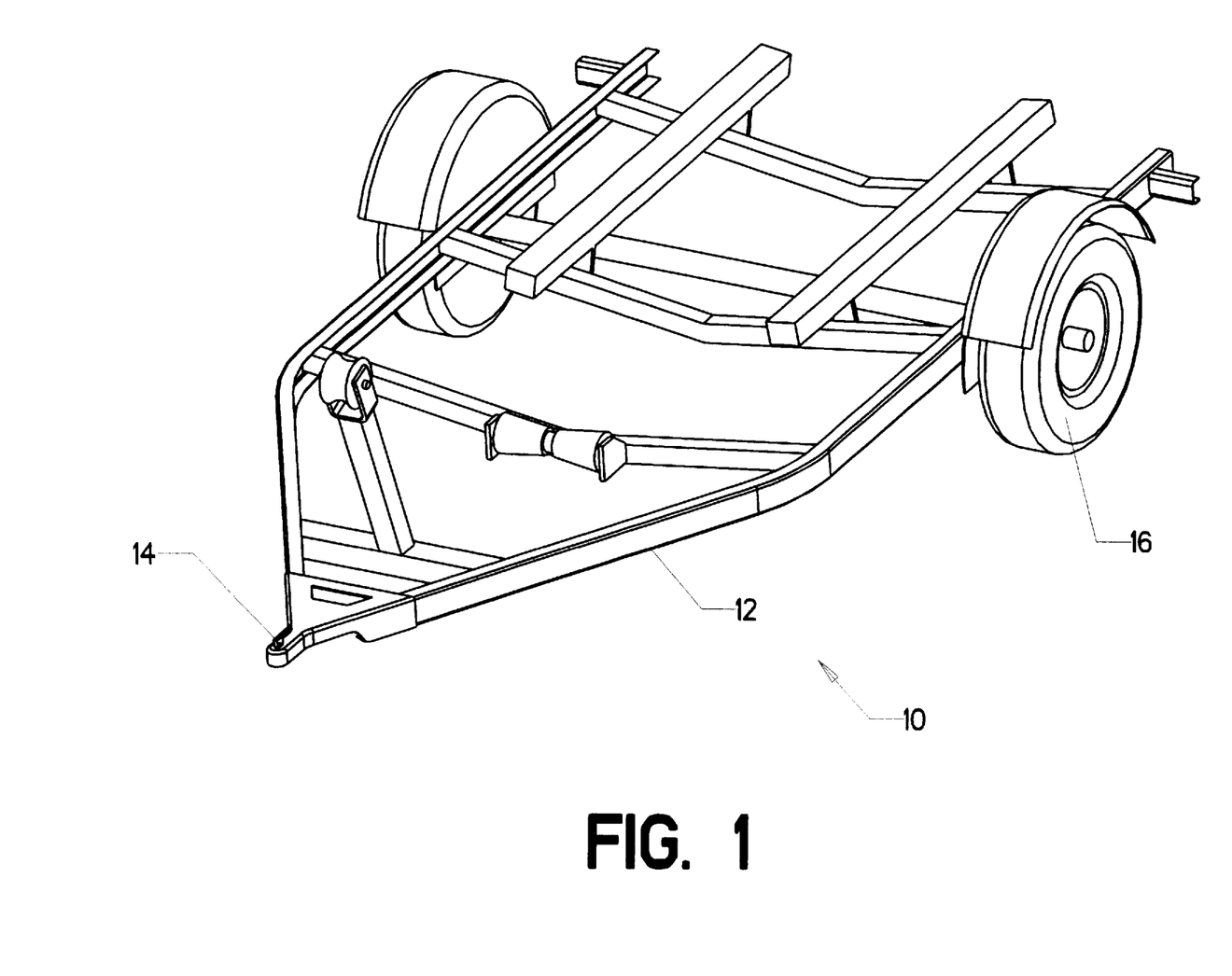
FIG. 1 is an isometric view, showing a prior art boat trailer.
Figure 2:
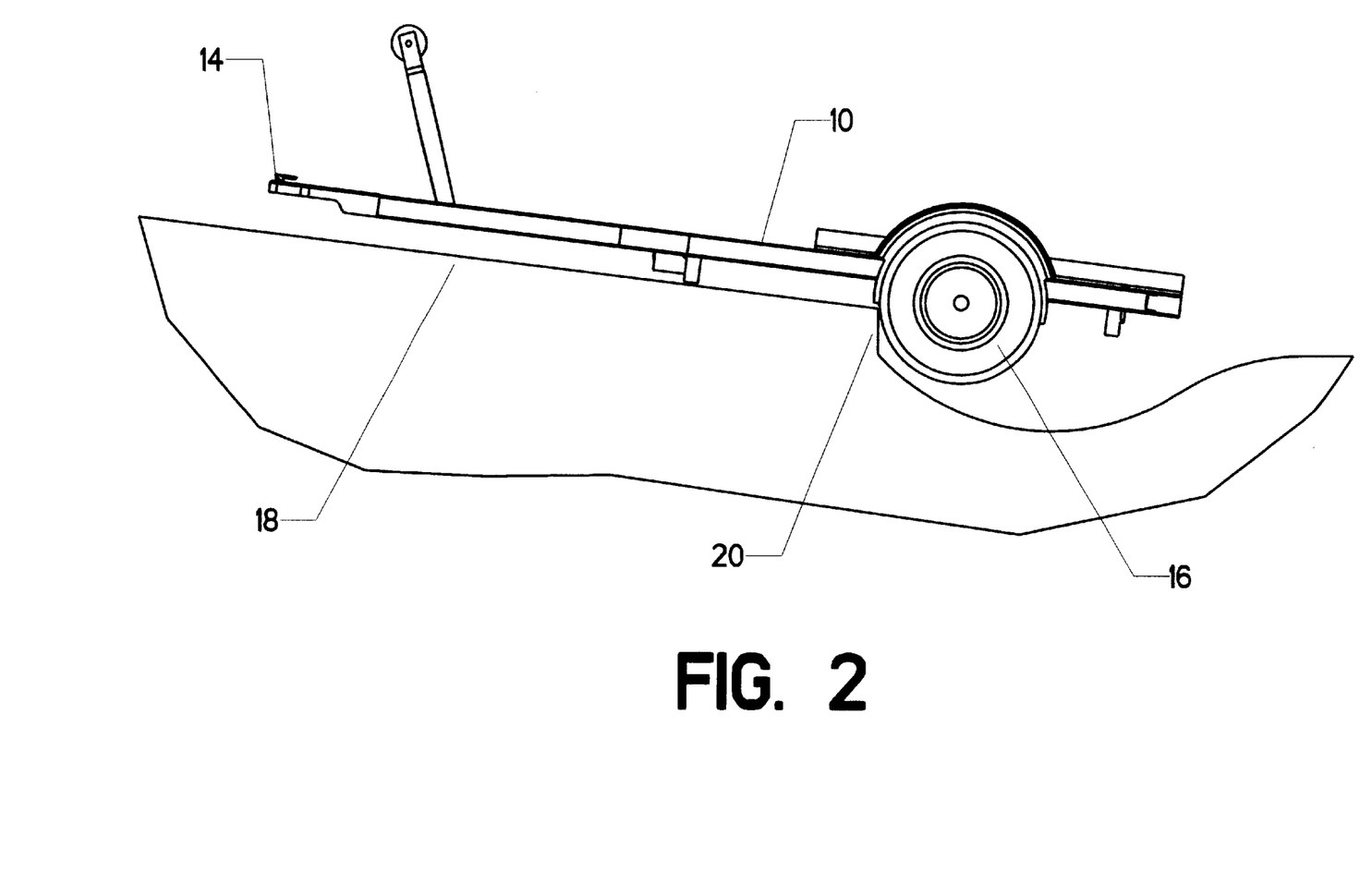
FIG. 2 is a side elevation view, showing a prior art trailer on a launching ramp.
Figure 3:
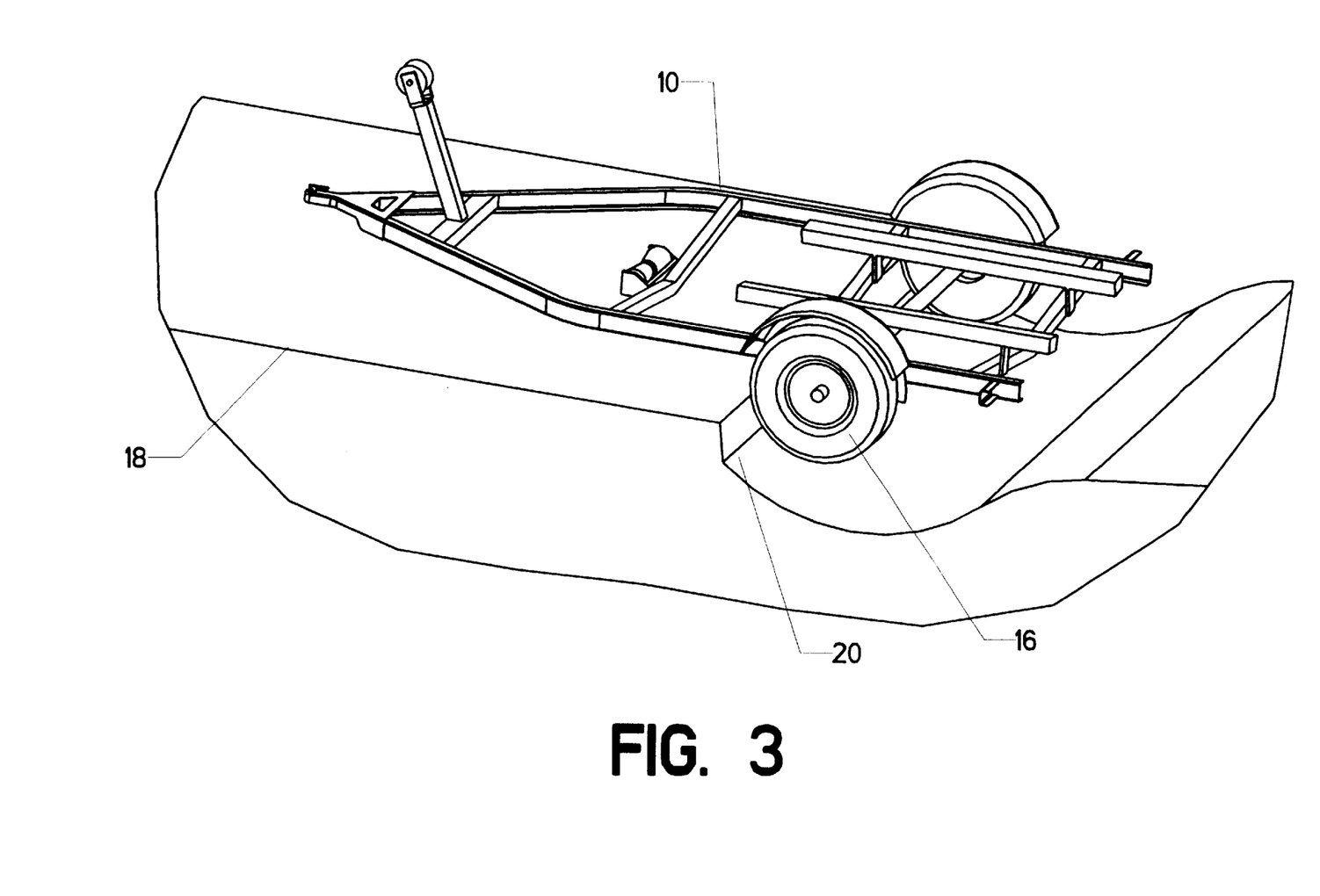
FIG. 3 is an isometric view, showing the same configuration illustrated in FIG. 2.

FIG. 1 illustrates a typical prior art trailer. Trailer 10 has primary elements trailer frame 12, hitch 14, and wheels 16. FIG. 2 illustrates trailer 10 positioned on ramp 18. The vehicle towing trailer 10 is not illustrated, although persons skilled in the art will readily comprehend that the towing vehicle is attached to trailer 10 at hitch 14. As shown, wheel 16 has slipped over ramp end 20. Ramp end 20 is an abrupt edge commonly found on the end of concrete ramps, especially in coastal regions where the sand bottom is scoured away from the ramp by wave and tidal actions. Ideally, trailer 10 would not be backed far enough to place wheel 16 over the end of ramp 18. However, when the water is low—such as near the time of low tide—the user must back trailer 10 to this point in order to get enough water over trailer 10 to recover the boat. FIG.2 illustrates a common situation where the sand or mud immediately off the end of ramp 18 has been scoured away by wave and propeller action. This phenomenon obviously worsens the problem described.

The reader will easily appreciate that once the boat is loaded on trailer 10 in this position, wheel 16 will be pulled forward against ramp end 20 as the towing vehicle attempts to pull trailer 10 up the ramp. Ramp end 20 acts as a wheel chock, making it very difficult to extract trailer 10. In addition, trailer 10 may actually be resting on the concrete surface, introducing further resistance to forward motion.

Several prior art inventions have attempted to generally remedy this concern. U.S. Pat. No. 5,228,713 to Kovach (1993) discloses a pivoting trailer which allows the boat to remain partially supported by the water as the trailer advances up the ramp. The primary purpose of the Kovach device is to properly position the boat over the trailer frame, with the result that the trailer may be safely placed in deeper water. It does not, however, directly address the objective of the present invention. In addition, the Kovach device is quite complex, requiring a moving assembly capable of guiding and supporting an object as heavy as a boat. This added complexity necessarily entails greater expense in the manufacturing of the trailer.

A simpler approach is disclosed in U.S. Pat. No. 4,895,347 to Anderson (1990). The Anderson device uses starting ramps placed on the launching ramp itself. These starting ramps allow the towing vehicle a short starting run in which the rear axle is not moving uphill. The Anderson device also discloses a system of chains and springs which are used to anchor the mobile ramps in position. Of course, the ramps must be carefully placed as the trailer is being backed into the water. This requirement means that either two persons are needed, or the vehicle driver must repeatedly stop and exit the vehicle. In addition, the use of large springs in the device introduces a safety hazard because they will store energy as they are extended.

The known devices for aiding the recovery of a boat trailer are therefore limited in that they:

1. Require the use of a large moveable assembly on the boat trailer;
2. Are expensive to produce;
3. Require the vehicle driver to repeatedly stop and exit the vehicle; and
4. Introduce a safety hazard.

OBJECTS AND ADVANTAGES

Accordingly, several objects and advantages of the present invention are:

1. To eliminate the use of any moveable assemblies on the trailer;
2. To provide a relatively inexpensive device;
3. To provide a device which does not require the driver to stop and exit the vehicle; and
4. To provide a device which does not use springs or other energy storage devices which could introduce a safety hazard.

| Reference Numerals in Drawings | |
|---|---|
| 10 | trailer |
| 12 | trailer frame |
| 14 | hitch |
| 16 | wheel |
| 18 | ramp |
| 20 | ramp end |
| 22 | skid assembly |

-continued

Reference Numerals in Drawings

| | |
|---|---|
| 24 | skid plate |
| 26 | rear skid mount |
| 28 | front skid mount |
| 30 | front mounting hole |
| 32 | rear adjustment hole |
| 34 | rear link |
| 36 | front link |
| 38 | front mounting bracket |
| 40 | rear mounting bracket |
| 42 | top clamp |
| 44 | clamp bolt |
| 46 | cross bolt |
| 48 | rear link hole |
| 50 | front link hole |
| 52 | front bracket hole |
| 54 | rear bracket hole |

DESCRIPTION OF THE INVENTION

FIG. 1 depicts a conventional, prior art boat trailer. While many different types of boat trailers are in use, the primary features of the trailer type illustrated will suffice to explain how the proposed invention may be applied to virtually any type.

Figure 6:
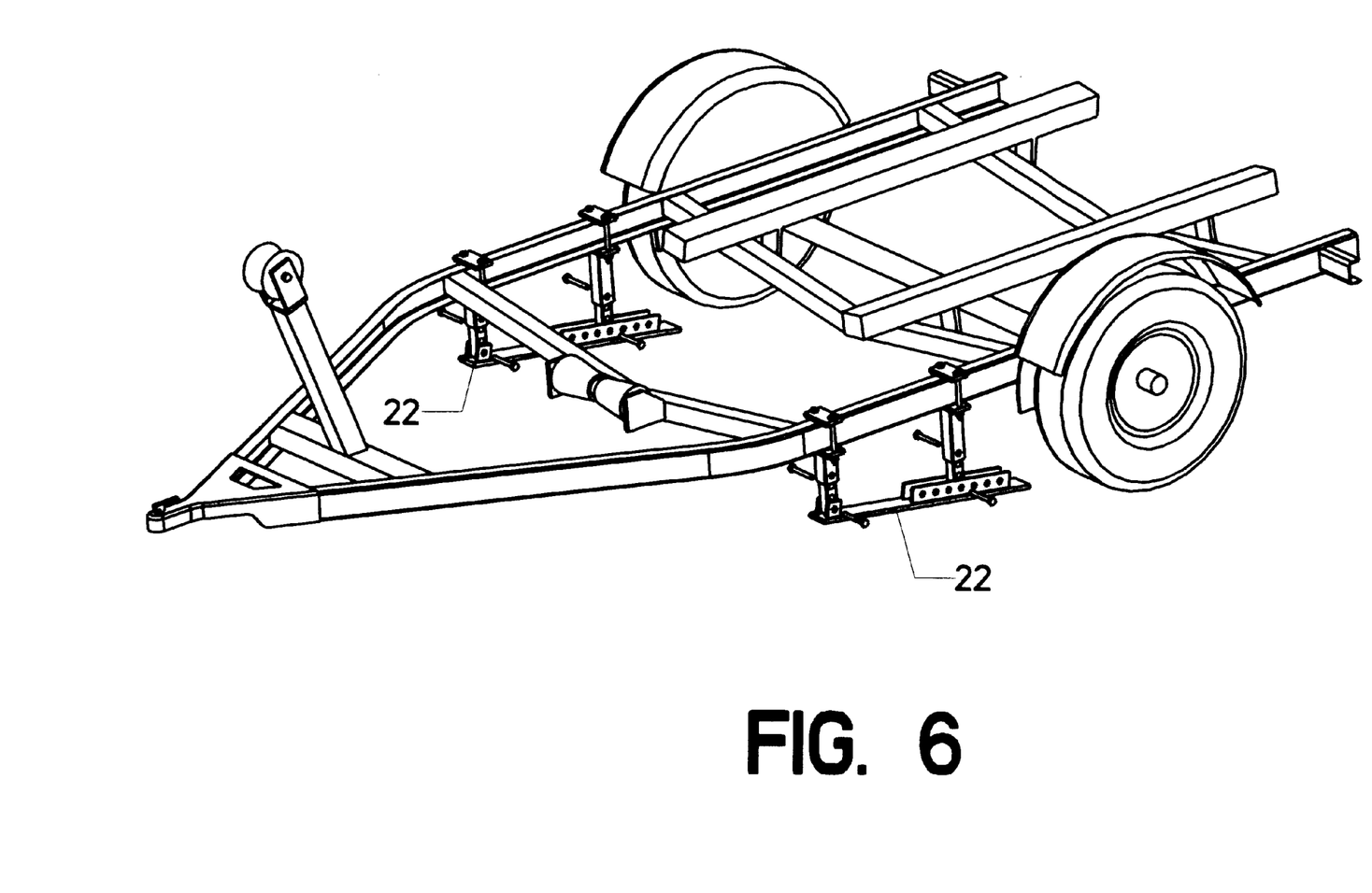
FIG. 6 is an isometric view, showing the proposed invention attached to a prior art boat trailer.
Figure 7:
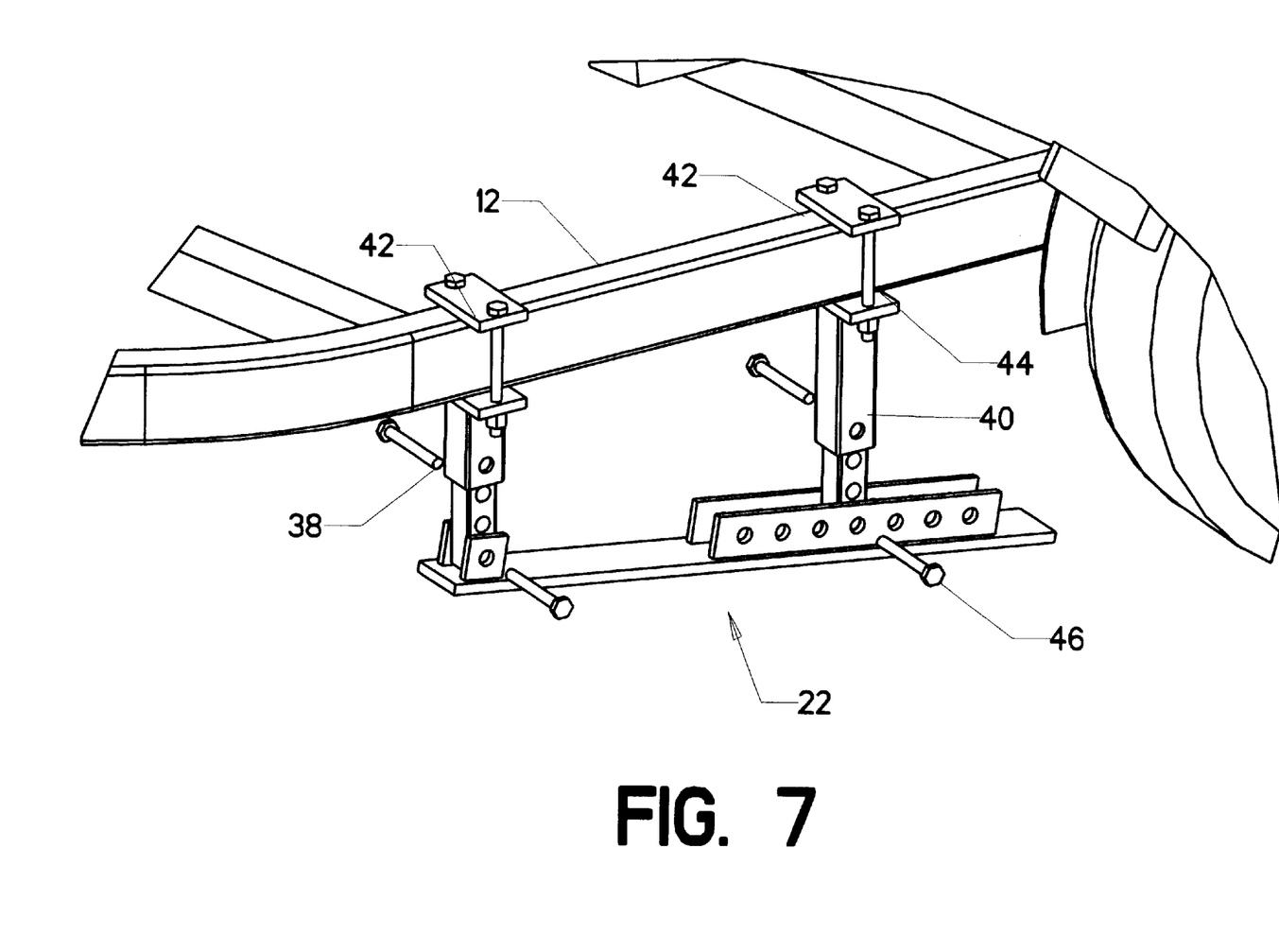
FIG. 7 is an isometric view showing more detail of the configuration illustrated in FIG. 6.

FIG. 6 illustrates the proposed invention attached to the prior art trailer depicted in FIG. 1. A pair of skid assemblies 22 are attached to trailer frame 12, just forward of each wheel 16. FIG. 7 shows the position of skid assemblies 22 in greater detail.

Figure 4:
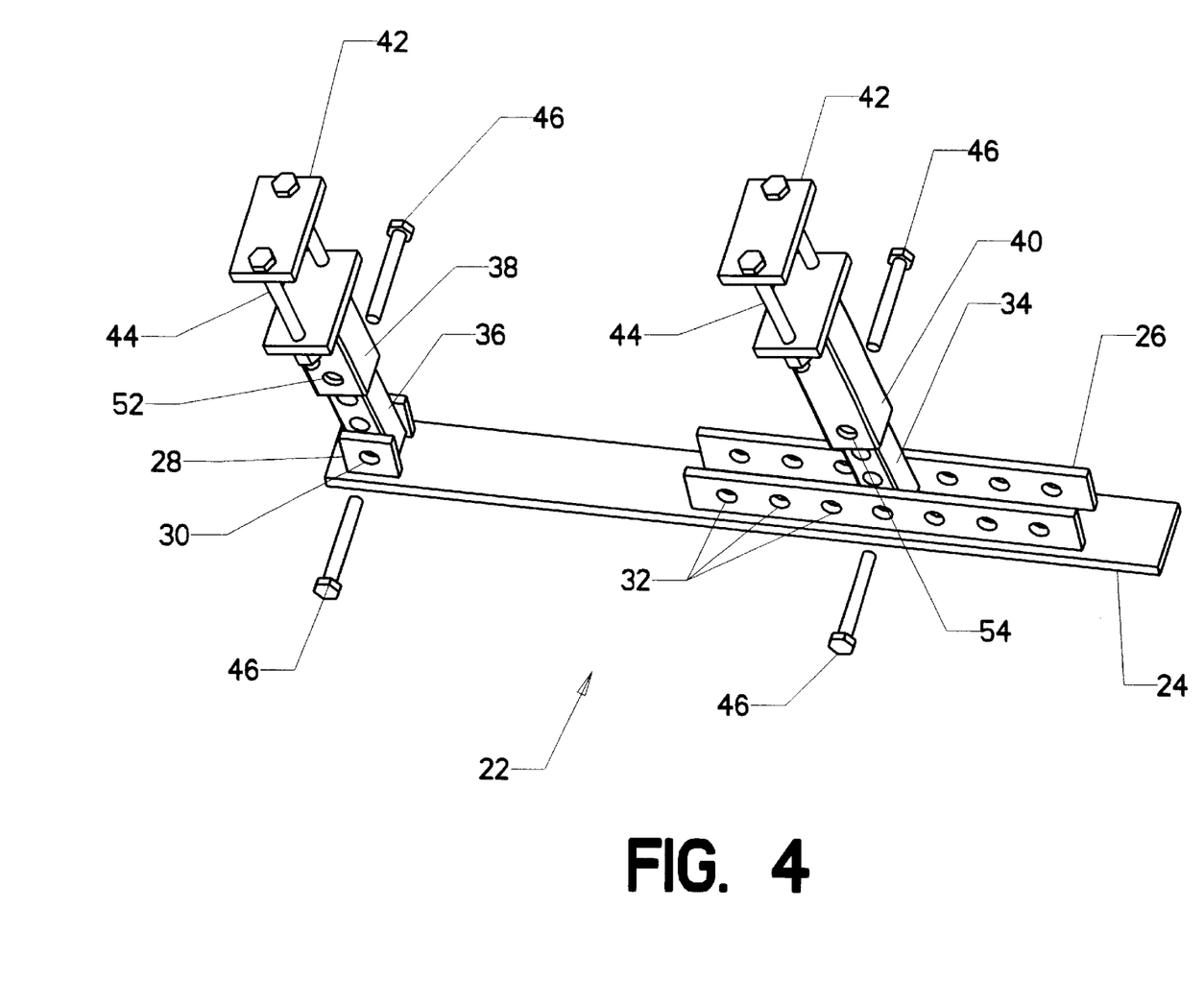
FIG. 4 is an isometric view, showing the proposed invention.

FIG. 4 shows the components comprising skid assembly 22. Skid plate 24 is a long and relatively narrow piece typically made of metal. Rear skid mount 26 is attached to skid plate 22 near its rear portion as shown, typically by welding. Rear skid mount 26 has several rear adjustments holes 32 passing completely through from side to side.

Front skid mount 28 is attached to skid plate 22 near its forward portion. Front skid mount 28 has a single front mounting hole 30 passing completely through from side to side. Rear mounting bracket 40 is positioned roughly above rear skid mount 26, and is attached to rear skid mount 26 by rear link 34. Likewise, front mounting bracket 38 is positioned roughly above front skid mount 28 and is attached to front skid mount 28 by front link 36. Cross bolts 46 are employed to lock the various components together, as will be explained in the following.

The upper portions of front mounting bracket 38 and rear mounting bracket 40 are designed to bear against a lower surface of trailer frame 12. Top clamps 42 are positioned above both front mounting bracket 38 and rear mounting bracket 40. Top clamps 42 are drawn down against the upper surface of trailer frame 12 by four clamp bolts 44, as shown.

FIG. 7 shows a detailed view of skid assembly 22 clamped to trailer frame 12. The reader may easily observe in this view how the action of clamp bolts 44 and top clamps 42 secure the device to trailer frame 12.

Figure 5:
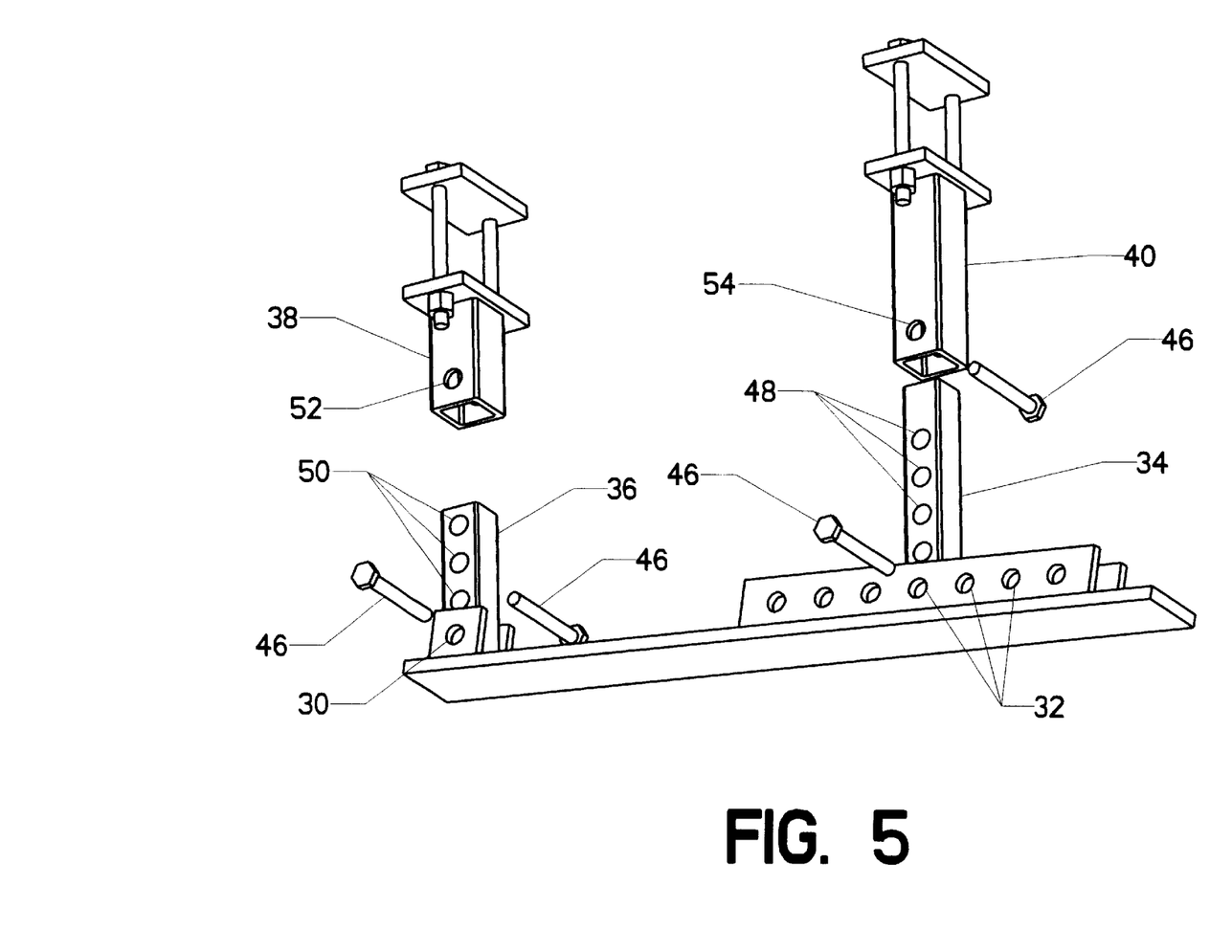
FIG. 5 is an exploded isometric view, showing more detail of the proposes invention.

Turning to FIG. 5, the use of cross bolts 46 to lock the components together will be explained. Rear link 34 is free to slide up and down within a hollow cavity inside rear mounting bracket 40. Rear link 34 has several transverse rear link holes 48, which pass completely through it. The lower portion of rear mounting bracket 40 has a single rear bolt hole 54 passing completely through it. The user may extend or retract rear link 34 within rear mounting bracket 40 until the desired rear link hole 48 aligns with rear bolt hole 54. The user then locks rear link 34 in position by placing a cross bolt 46 through the aligned assembly. Cross bolt 46 may be held in place using a nut, a cotter pin, or other conventional device. The lowest rear link hole 48 is then aligned with one of the rear adjustment holes 32 on rear skid mount 26. Once alignment is achieved, the user locks rear link 34 to skid plate 24 by placing a second cross bolt 46 through the aligned assembly, again holding cross bolt 46 in place by conventional means.

A similar process is followed for front mounting bracket 38. Front link 36 is extended and retracted to align front link holes 50 with the single front bracket hole 52. Once alignment is achieve, the user places a third cross bolt 46 through the assembly. The user then locks front link 36 to skid plate 24 by placing a fourth cross bolt 46 through front mounting hole 30 and through the lowest front link hole 50.

Those skilled in the art will appreciate that the previously described adjustment devices allow the user to place skid assembly 22 is virtually any required position. Skid assembly 22 may be moved forward and backward along trailer 10 by loosening clamp bolts 44. The vertical drop of both the forward and rear portions of skid plate 24, relative to trailer frame 12, may be adjusted. Finally, the angle of skid plate 24 relative to trailer 10 may be adjusted by moving rear mounting bracket 40 closer to or further away from front mounting bracket 38.

FIG. 6 shows a pair of skid assemblies 22 attached to a boat trailer. FIG. 7 shows a closer view of the same configuration. Front mounting bracket 38 and rear mounting bracket 40 are positioned against the underside of trailer frame 12. Top clamps 42 are positioned against the upper side of trailer frame 12. Four clamp bolts 44 are then passed through the holes provided in top clamps 42, front mounting bracket 38, and rear mounting bracket 40—as shown. Nuts are placed on clamp bolts 44 and these are tightened to draw the assembly together, clamping it against trailer frame 12. Those skilled int he art will realize that skid assembly 22 may be very tightly locked to trailer frame 12 using the components described. This fact is signficant, as considerable weight must be supported by skid assembly 22.

Figure 8:
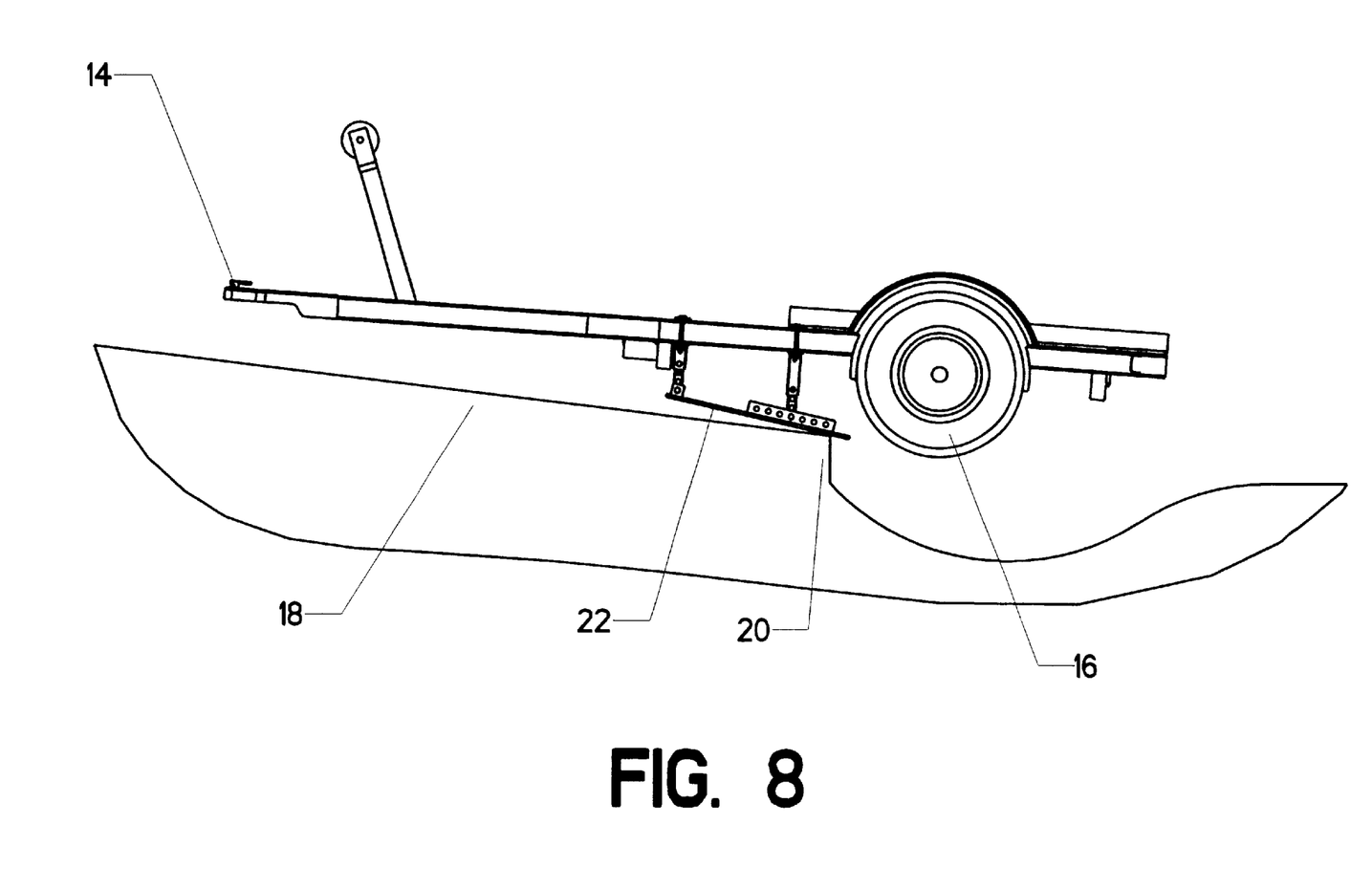
FIG. 8 is a side elevation view, showing the operation of the invention.

FIG. 8 shows the device properly positioned and in its intended use. The reader will observe that skid assembly 22 is placed just forward of tire 16. The user has backed trailer 10 to a position where tire 16 would normally have rolled abruptly off of ramp end 20, thereby creating the problem described in the "BACKGROUND" section of this disclosure. However, the present invention has prevented this problem. The reader will observe that the weight of the trailer is now supported by skid assembly 22, which rests on the edge of ramp 18. The action of skid assembly 22 has in effect extended the useful length of the ramp.

Figure 9:
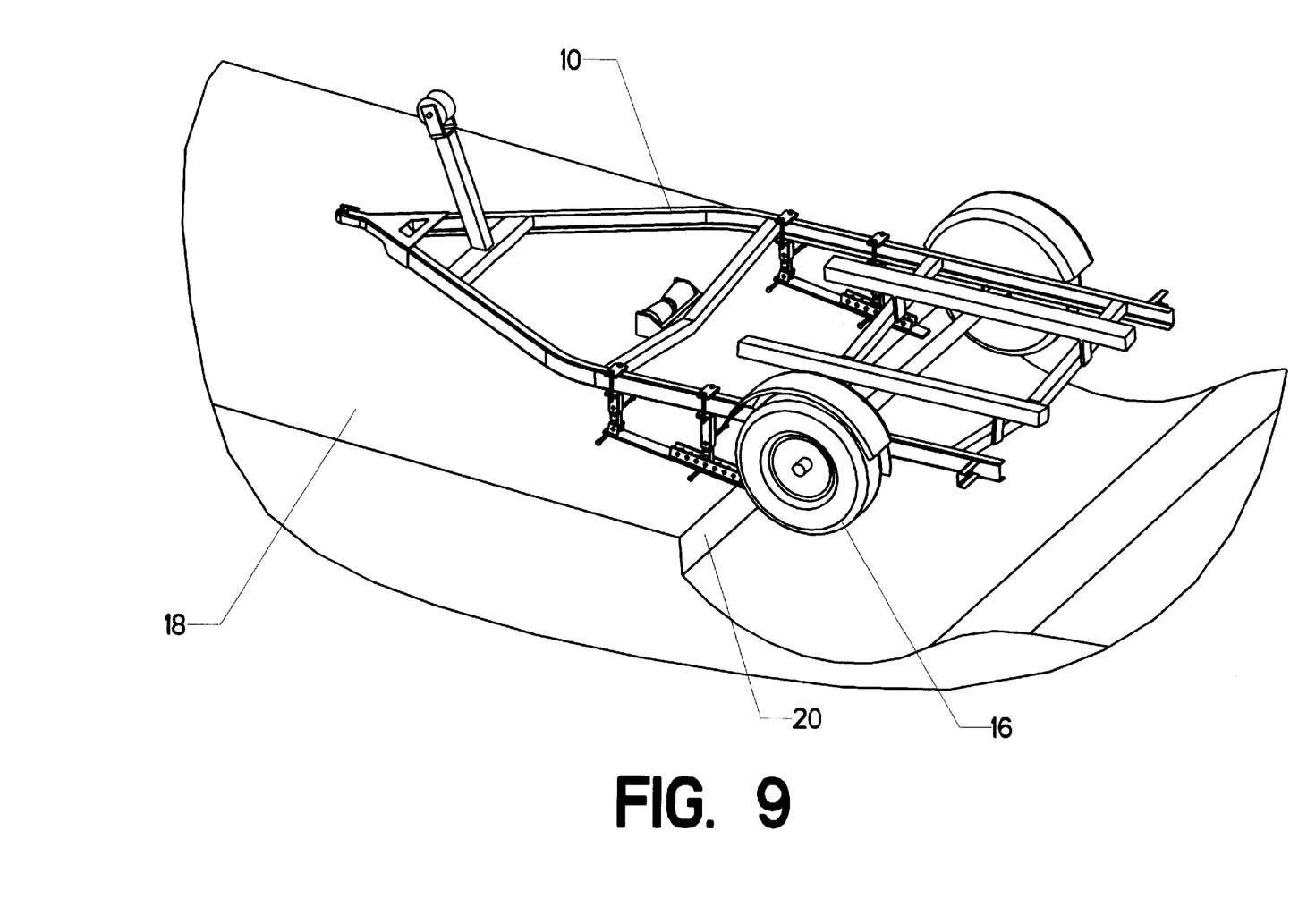
FIG. 9 is an isometric view, showing the same configuration illustrated in FIG. 8.

FIG. 9 shows the same situation in an isometric view for greater clarity. The pair of properly positioned skid assemblies 22 have prevented wheels 16 from rolling over ramp end 20.

When skid plates 24 come to rest on the surface of ramp 18, friction is greatly increased. The user will notice that the backing has gone from a smooth rolling action, where wheels 16 were rolling along, to an abrupt grating action as skid plates 24 are forced along the commonly rough surface of ramp 18. This change alerts the user that he or she should back no further.

Material selection is significant for the components of skid assembly 22. The assembly must be able to support considerable weight. Corrosion is also a primary concern, since the assembly will be periodically immersed in water (often salt water). Likewise, galvanic corrosion between the trailer and skid assembly 22 is a concern. Steel and aluminum have been found to be suitable materials. Both these materials must be coated to resist corrosion. It is also important to match the materials to the trailer; i.e., aluminum skid material on an aluminum trailer. Otherwise, galvanic corrosion is a problem.

Summary, Ramifications, and Scope

Accordingly, the reader will appreciate that the proposed invention greatly reduces the possibility that the user will back the trailer wheels over the end of a boat ramp. The invention has further advantages in that it:

1. eliminates the use of any moveable assemblies on the trailer;
2. provides a relatively inexpensive solution;
3. does not require the driver to stop and exit the vehicle during operation;
4. does not use springs or other energy storage devices which could introduce a safety hazard.

Although the preceding description contains significant detail, it should not be construed as limiting the scope of the invention but rather as providing illustrations of the preferred embodiment of the invention. For example, many different approaches could be used to attach skid plate 24 to trailer frame 12, many different types of adjustment could be provided, many different type of retaining devices could be used to secure cross bolts 46 in place, etc. Thus, the scope of the invention should be fixed by the following claims, rather than by the examples given.

Having described my invention, I claim:

1. A device for preventing the wheel of a boat trailer, wherein said trailer comprises a trailer frame with at least one wheel attached on the left side thereof and at least one wheel attached on the right side thereof, from dropping down against the end of a ramp as said trailer is backed down said ramp, comprising:
   a. a first skid plate, having a forward portion and a rearward portion, being substantially in the shape of a rectangle with the long axis of said rectangle running parallel to the long axis of said trailer, and being positioned below said trailer frame and immediately forward of said at least one wheel on said left side of said trailer;
   b. means for attaching said first skid plate to said trailer frame so that the vertical separation between said forward portion of said first skid plate and said trailer frame can be adjusted and fixed, and so that the vertical separation between said rearward portion of said first skid plate and said trailer frame can be adjusted and fixed;
   c. a second skid plate, having a forward portion and a rearward portion, being substantially in the shape of a rectangle with the long axis of said rectangle running parallel to the long axis of said trailer, and being positioned below said trailer frame and immediately forward of said at least one wheel on said right side of said trailer; and
   d. means for attaching said second skid plate to said trailer frame so that the vertical separation between said forward portion of said second skid plate and said trailer frame can be adjusted and fixed, and so that the vertical separation between said rearward portion of said second skid plate and said trailer frame can be adjusted and fixed.

2. A device as recited in claim 1, wherein said attaching means comprises at least one vertical member, having an upper end and a lower end, wherein said lower end is affixed to said skid plate, and said upper end is affixed to said trailer frame.

3. A device as recited in claim 1, wherein said attaching means for each of said first and second skid plates comprises:
   a. a front mounting bracket, having an upper portion and a lower portion, bolted to said trailer frame directly above said forward portion of said skid plate, wherein said lower portion of said front mounting bracket opens into a rectangular cavity extending upward, and wherein said front mounting bracket is pierced completely through by a transverse front bracket hole;
   b. a rectangular front link, having an upper portion and a lower portion, wherein said upper portion is sized to slide within said rectangular cavity in said front mounting bracket, and wherein said front link is pierced completely through by a plurality of spaced transverse front link holes so that as said front link is moved up and down within said rectangular cavity, a particular one of said plurality of front link holes will align with said front bracket hole;
   c. a first cross bolt, placed through said aligned front link hole and said front bracket hole so as to lock said front link in a desired length of extension with respect to said front mounting bracket;
   d. wherein said skid plate has forward attachment means for rotatably attaching said skid plate to said lower portion of said front link proximate said forward portion of said skid plate;
   e. a rear mounting bracket, having an upper portion and a lower portion, bolted to said trailer frame directly above said rearward portion of said skid plate, wherein said lower portion of said rear mounting bracket opens into a rectangular cavity extending upward, and wherein said rear mounting bracket is pierced completely through by a transverse rear bracket hole;
   f. a rectangular rear link, having an upper portion and a lower portion, wherein said upper portion is sized to slide within said rectangular cavity within said rear mounting bracket, and wherein said rear link is pierced completely through by a plurality of spaced transverse rear link holes so that as said rear link is moved up and down within said rectangular cavity, a particular one of said plurality of rear link holes will align with said rear bracket hole;
   g. a second cross bolt, placed through said aligned rear link hole and said rear bracket hole so as to lock said rear link in a desired length of extension with respect to said rear mounting bracket; and
   h. wherein said skid plate has rearward attachment means for rotatably attaching said skid plate to said lower portion of said rear link proximate said rearward portion of said skid plate, so that the combination of the adjustable length of extension of said front length and the adjustable length of extension of said rear link allows the vertical separation between said skid plate and said trailer frame to be adjusted and allows the angle of said skid plate to be adjusted relative to said trailer frame.

4. A device as recited in claim 1, wherein said skid plate has an upper surface, a lower surface, a rear end, and a front end, and wherein said attaching means comprises:
   a. a rear skid mount, consisting of a vertical wall, affixed to said upper surface of said skid plate proximate said rear end of said skid plate, with said vertical wall opening into at least one rear adjustment hole passing completely therethrough;

b. a rear mounting bracket, being affixed to said trailer frame above the position of said rear skid mount; and c. a rear link, having an upper end and a lower end, with said upper end being affixed to said rear mounting bracket and said lower end being affixed to said rear skid mount on said skid plate.

5. A device as recited in claim 4, further comprising:

a. a front skid mount, consisting of a vertical wall, affixed to said upper surface of said skid plate proximate said front end of said skid plate, with said vertical wall opening into a front mounting hole passing completely therethrough;

b. a front mounting bracket, being affixed to said trailer frame above the position of said front skid mount; and c. a front link, having an upper end and a lower end, with said upper end being affixed to said front mounting bracket and said lower end being affixed to said front skid mounting on said skid.

6. A device for preventing the wheel of a boat trailer, wherein said trailer comprises a trailer frame with at least one wheel attached on the left side thereof and at least one wheel attached on the right side thereof, from dropping down against the end of a ramp as said trailer is backed down said ramp, comprising:

a. a first skid plate, having a forward portion and a rearward portion, being substantially in the shape of a rectangle with the long axis of said rectangle running parallel to the long axis of said trailer, and being positioned below said trailer frame and immediately forward of said at least one wheel on said left side of said trailer;

b. a first front link, rotatably attached to said forward portion of said first skid plate, and adjustably and slidably attached to said trailer frame above said forward portion of said first skid plate, so that the vertical separation between said forward portion of said first skid plate and said trailer frame can be adjusted and fixed; and c. a first rear link, rotatably attached to said rearward portion of said first skid plate, and adjustably and slidably attached to said trailer frame above said rearward portion of said first skid plate, so that the vertical separation between said rearward portion of said first skid plate and said trailer frame can be adjusted and fixed.

7. A device as recited in claim 6, further comprising:

a. a second skid plate, having a forward portion and a rearward portion, being substantially in the shape of a rectangle with the long axis of said rectangle running parallel to the long axis of said trailer, and being positioned below said trailer frame and immediately forward of said at least one wheel on said right side of said trailer;

b. a second front link, rotatably attached to said forward portion of said second skid plate, and adjustably and slidably attached to said trailer frame above said forward portion of said second skid plate, so that the vertical separation between said forward portion of said second skid plate and said trailer frame can be adjusted and fixed; and a second rear link, rotatably attached to said rearward portion of said second skid plate, and adjustably and slidably attached to said trailer frame above said rearward portion of said second skid plate, so that the vertical separation between said rearward portion of said first second skid plate and said trailer frame can be adjusted and fixed.

* * * * *